United States Patent
Jang

(10) Patent No.: US 7,379,293 B2
(45) Date of Patent: May 27, 2008

(54) MULTIPLE SPLIT RING CATHODE RAY TUBE CLAMP

(75) Inventor: Sam Jang, Morton Grove, IL (US)

(73) Assignee: Richco Inc., Morton Grove, IL (US)

( * ) Notice: Subject to any disclaimer, the term of this patent is extended or adjusted under 35 U.S.C. 154(b) by 0 days.

(21) Appl. No.: 11/788,807

(22) Filed: Apr. 19, 2007

(65) Prior Publication Data

US 2007/0217136 A1  Sep. 20, 2007

Related U.S. Application Data

(62) Division of application No. 10/685,855, filed on Oct. 16, 2003, now Pat. No. 7,209,345.

(51) Int. Cl.
*H05K 7/20* (2006.01)
*H01J 29/80* (2006.01)
*H04N 5/645* (2006.01)
*H01R 13/62* (2006.01)

(52) U.S. Cl. ...................... 361/682; 361/815; 313/404; 313/440; 348/825; 348/829; 348/830; 348/836; 439/366

(58) Field of Classification Search ................ 361/682, 361/825; 348/836, 825, 829, 830, 831, 843; 445/36; 403/289, 326; 313/402–404, 440, 313/456, 482, 261, 281, 292, 391, 438

See application file for complete search history.

(56) References Cited

U.S. PATENT DOCUMENTS 4,128,918 A * 12/1978 Wenk .......................... 24/16 R
5,745,348 A *  4/1998 Cha ............................ 361/815

* cited by examiner

*Primary Examiner*—Jayprakash Ghandi
*Assistant Examiner*—Zachary M Pape
(74) *Attorney, Agent, or Firm*—Martin Faier; James Faier; Faier & Faier PC

(57) ABSTRACT

A multiple split ring clamp for securing a printed circuit board on a cathode ray tube, in which the clamp first split ring has overlapping jaws and teeth on each end of the jaws, wherein the jaws and teeth are adapted to engage and hold the clamp on the cathode ray tube, and wherein the clamp has a second ring and stand-off which is adapted for removably securing a printed circuit board on but spaced apart from the first ring and cathode ray tube. The first split ring may be connected to but independent from the second ring and standoff so that movement of the clamp will not affect the position of the stand-off.

12 Claims, 3 Drawing Sheets

MULTIPLE SPLIT RING CATHODE RAY TUBE CLAMP

This application is a Divisional application of prior application Ser. No. 10/685,855 filed Oct. 16, 2003 for a CATHODE RAY TUBE CLAMP, which will issue as U.S. Pat. No. 7,209,345 on Apr. 24, 2007.

This invention relates to a new and novel MULTIPLE SPLIT RING CATHODE RAY TUBE CLAMP (CRT), and is more particularly directed to such a device which is may be rigidly removably secured on the neck of a CRT tube for mounting a printed circuit board or other component on the tube.

This application is a division of prior application Ser. No. 10/685,855, filed Oct. 16, 2003 for a CATHODE RAY CLAMP.

BACKGROUND OF THE INVENTION

In assembling a television set or monitor, it is necessary and convenient to connect a printed circuit board or other component to the neck of a cathode ray tube ("CRT"). This connection must be rigid and be maintained during the life of the tube. For purposes of servicing, sometimes the printed circuit board is removed from the tube, and accommodation should be made for removal of the circuit board from the CRT.

Usually, in the prior art, the printed circuit board was connected to the neck of the CRT by means of a metal ring which could be tightened with a self taping or similar screw. Such an arrangement has been found to be cumbersome and may result in physical and/or electrical damage to the tube or circuit board, particularly during tightening of the screw. Also, the number of parts necessary to accomplish such securement of the printed circuit board on the neck of the CRT by means of a screw on a ring sometime resulted in the screw becoming loose over time, causing misalignment of the printed circuit board, and, additionally, required some care in maintaining inventory and arranging the parts for assembly and in the assembly of the connecting device onto the tube. The diameter of the yoke of some cathode ray tubes varies, and this variance in size can also cause problems for the connection of a device around its yoke.

Typical prior art yoke or CRT clamp arrangements are shown in Bickford U.S. Pat. No. 2,840,740, Cha et al U.S. Pat. No. 5,568,010, and Japan 200030634, and these devices have been used and/or modified to accommodate a printed circuit board or component. Such devices typify the difficulties in the prior art discussed above. Additionally, particularly when the assembled CRT and printed circuit board had to be moved, there was always the danger of a weak connection, which could become weaker during completion of assembly of the television or monitor and during transport of the assembled tube and printed circuit board.

SUMMARY OF THE INVENTION

The present invention offers a one piece solution to the problems noted above, by providing a one piece non-conductive plastic CRT clamp structured for rigid connection to the neck or yoke of a Cathode Ray Tube. Such a CRT clamp is molded or otherwise fabricated preferably from plastic in one piece. The yoke clamp of the present invention in some ways resembles prior art hose clamps, such as those disclosed in Wenk U.S. Pat. No. 4,128,918, Due U.S. Pat. No. 4,935,992 or Kruger U.S. Pat. No. 5,095,564, but those prior art hose clamps had no means or conception for removably but rigidly engaging a printed circuit board or component spaced apart from its mounting on a cathode ray tube, as is the case with the present invention.

In the present invention, the yoke clamp is characterized by a multiple split ring with cooperating overlapping ends having teeth for securing the clamp around the neck of a cathode ray tube, and spaced away from the clamp and teeth, the device has a spaced apart legs which act as a stand-off for removably securing an apertured printed circuit board on the ends of the legs opposing the clamp. This arrangement provides secured means for detachably rigidly mounting a printed circuit board on the yoke clamp spaced apart from the cathode ray tube.

Another embodiment of the invention provides clamping means independent of the printed circuit board or component standoff, in such a way that the movement in the clamping mechanism will not cause the location of the standoff to change.

OBJECTS OF THE INVENTION

It is the object of the invention to provide a novel clamp of the character recited for mounting a printed circuit board or other component on a cathode ray tube.

Another object is to provide a novel clamp for a CRT preferably fabricated from plastic which has means for rigidly securely engaging the neck of the CRT.

Another object is to provide a novel clamp for a CRT which has integral stand-offs for securely detachably receiving an apertured printed circuit board spaced apart from but in alignment with a cathode ray tube on which the clamp is mounted.

Another object is to provide a novel one piece clamp for a CRT which has a clamping portion independent of its means for mounting a printed circuit board or other component.

Another object is to provide a novel one piece clamp for a CRT which is fabricated in one piece ready for use, without tools or fasteners.

Another object is to provide a novel clamp for removably rigidly securing a printed circuit board on the neck of a cathode ray tube which is simple and efficient in design and easy to manufacture by conventional molding and other technics.

DESCRIPTION OF THE PREFERRED EMBODIMENT

Figure 1:
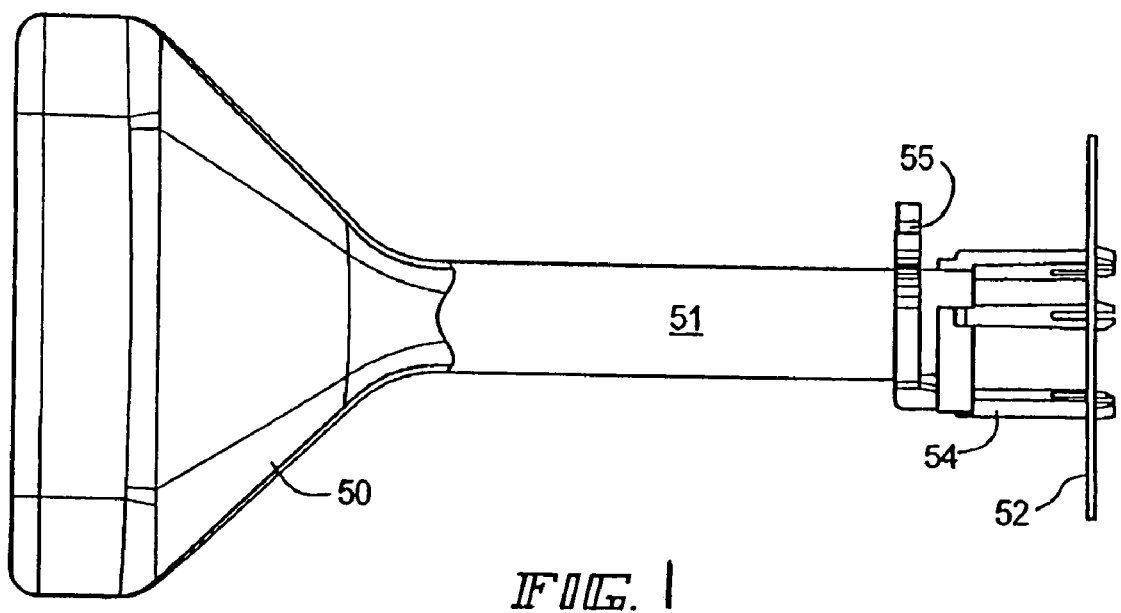
FIG. 1 is a view showing the multiple split ring clamp embodying the present invention carrying a printed circuit board and mounted on the neck of a cathode ray tube.
Figure 2:
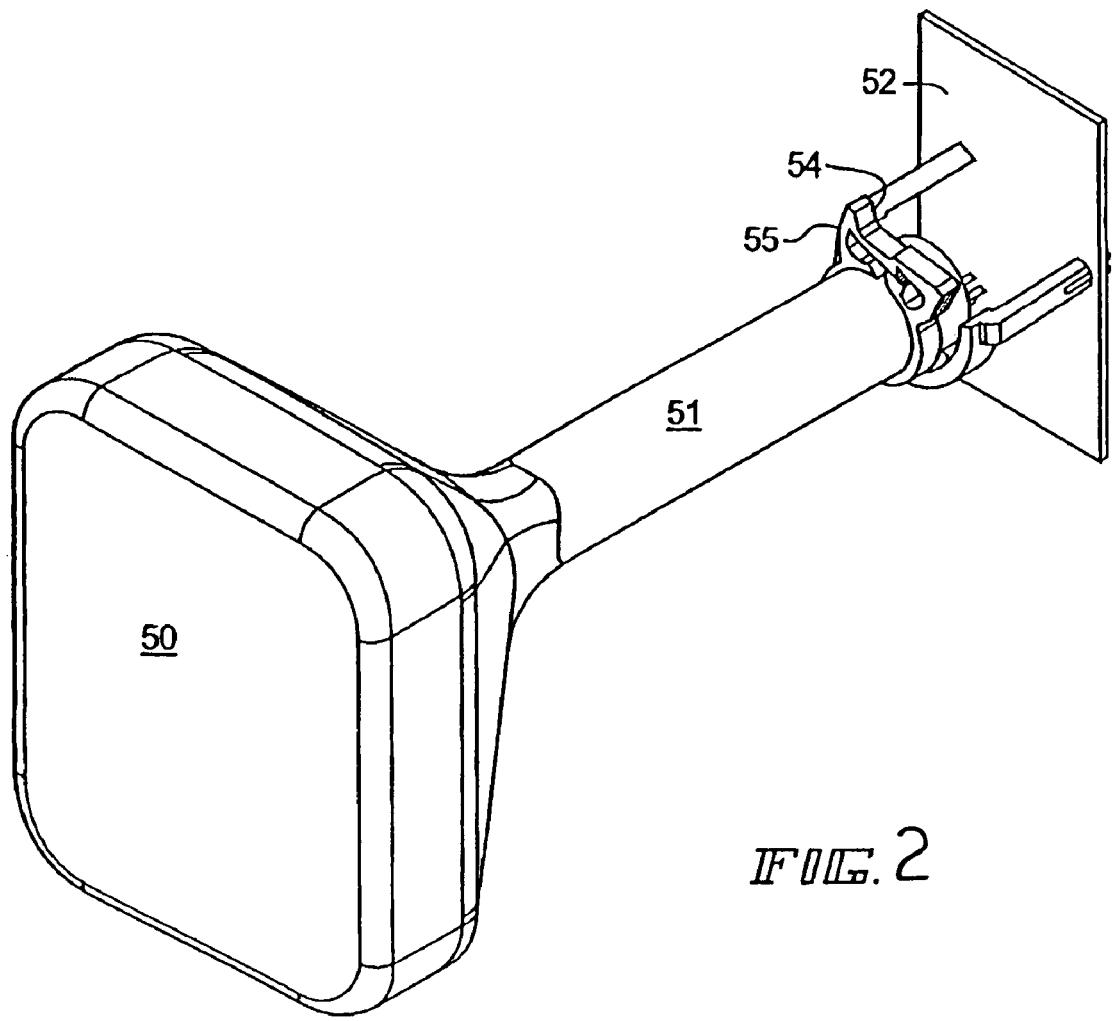
FIG. 2 is a perspective view of the clamp and CRT shown in FIG. 1.
Figure 3:
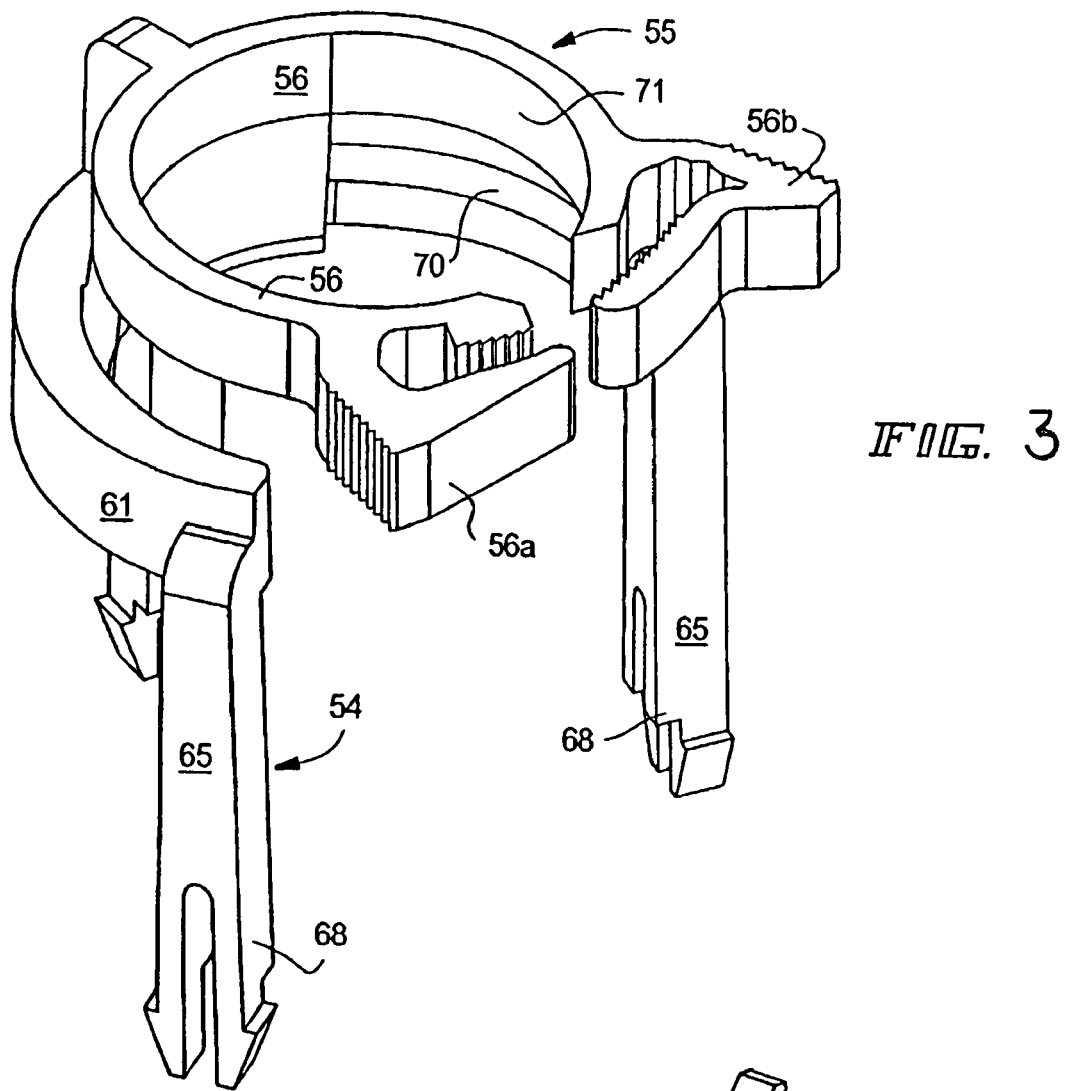
FIG. 3 is a side view of the clamp shown in FIG. 1.
Figure 4:
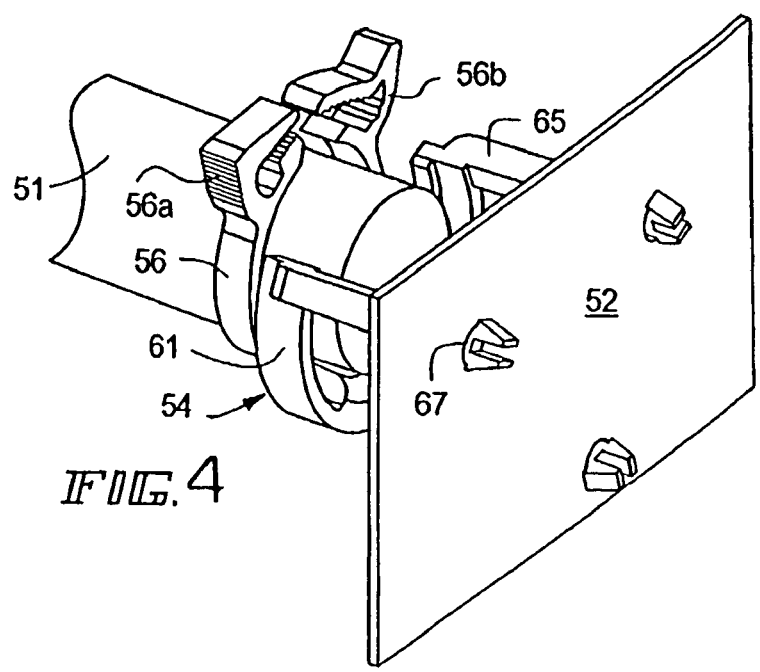
FIG. 4 is an enlarged perspective view of the clamp shown in FIG. 1.
Figure 5:
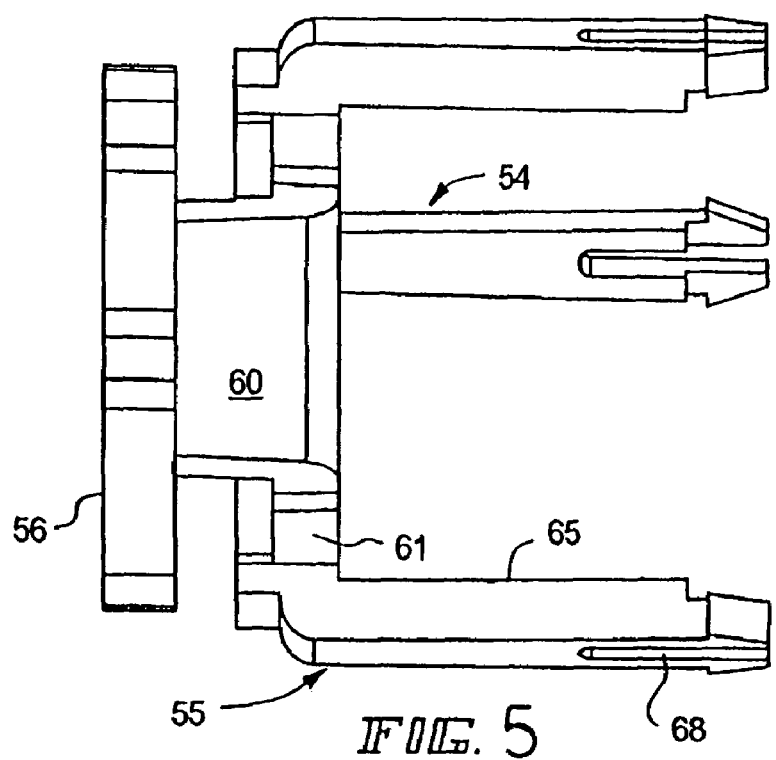
FIG. 5 is a perspective view of the clamp shown in FIG. 1 mounted on a CRT (partial) and carrying a circuit board.
Figure 6:
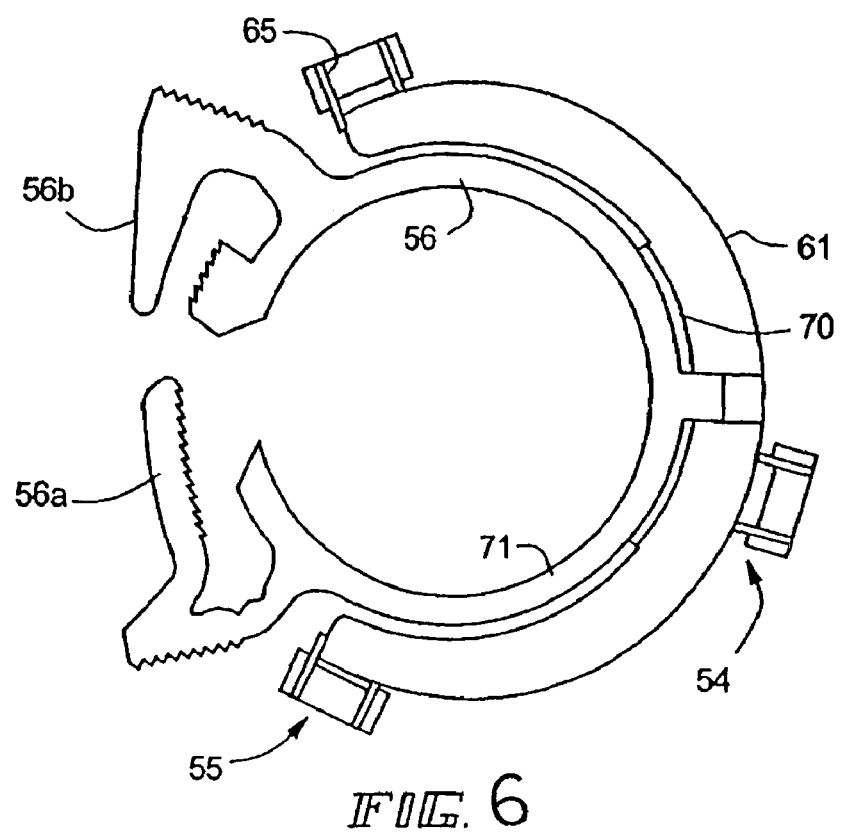
FIG. 6 is a side elevational view of the novel clamp embodiment shown in FIG. 1

With reference to FIGS. 1-6, the novel clamp 55 is arranged on the neck or yoke 51 of a cathode ray tube 50, and carries a printed circuit board 52 or other component on its standoff portion 54. This clamp 55 has a split ring 56 adapted to encircle the CRT neck 51 independently of the standoff portion 54 receiving a printed circuit board 52. The split ring 56 has opposed jaws 56a and 56b on its ends.

In this embodiment, a connecting leg 60 depends from the split ring 56 and is connected to the standoff portion 54. The standoff portion 54 has a split ring structure 61 spaced apart from but substantially parallel and concentric to the split ring 56, and carries spaced equidistantly apart standoff legs 65, each with a barbed head 68 for engaging an aperture 67 formed in a printed circuit board 52 or other component. Other conventional means for securing the printed circuit board 52 or component to a leg 65 or wing may be provided, such as a screw or other fastener for securing the printed circuit board to the end of the leg 65.

Preferably, it is also desirable to provide a relief 70 at least on one side of the split ring 56, so that its arm 71 may bend slightly when the clamps are tightened after the split ring bottoms out on the glass surface of the CRT yoke 51. The standoff portion 54 need not be cylindrical and need not have a hollow leg 65 or wing, as it may be rectangular and solid, as shown in FIGS. 6-10.

While a preferred embodiment of the invention has been shown in considerable detail, changes in the structure may be made without departing from the spirit or scope of the invention, and it is not intended that the invention be limited, except as limited by the appended claims.

The invention claimed is:

1. A yoke clamp for connecting a printed circuit board or other component to the neck of a cathode ray tube, said yoke clamp comprising:
   a first split ring to encircle and hold around said cathode ray tube neck;
   connecting means at each end of said first split ring including a cooperating series of barbs or teeth, the connecting means removably holding said first split ring around said cathode ray tube neck;
   a second split ring attached to the first split ring, the second split ring at least partially encircling the cathode ray tube neck;
   a plurality of stand-offs extending from the second split ring and maintaining the circuit board or other component a fast distance away from the cathode ray tube neck and a second distance away from the second split ring,
   the plurality of stand-offs each having an end remote from the first and second split rings, the remote end including means for removably receiving and securing the circuit board on the clamp,
   wherein said first and second split rings are attached by a connecting leg.

2. The clamp recited in claims 1, wherein said stand-off receiving and securing means comprises a barbed head and seat for connecting said circuit board on said clamp.

3. The clamp recited in claim 1, wherein the connecting leg maintains a relief between the first and second split rings.

4. The clamp recited in claim 1, wherein the stand-offs are perpendicular to the second split ring and substantially parallel to the neck of the cathode ray rube.

5. The clamp recited in claim 1, wherein the circuit board has an aperture and the receiving and securing means is secured in said aperture.

6. The clamp recited in claim 1, wherein the stand-offs are equidistantly apart.

7. The clamp recited in claim 1, wherein the circumference of the first split ring may be contracted or expanded independently of the circumference of the second split ring.

8. A yoke clamp for connecting a printed circuit board or other component to the neck of a cathode ray tube, said yoke clamp comprising:
   a first split ring to encircle and hold around said cathode ray tube neck;
   connecting means at each end of said first split ring including a cooperating series of barbs or teeth, the connecting means removably holding said first split ring around said cathode ray tube neck;
   a second split ring attached to the first split ring, the second split ring at least partially encircling the cathode ray tube neck;
   a plurality of stand-offs extending from the second split ring and maintaining the circuit board or other component a first distance away from the cathode ray tube neck and a second distance away from the second split ring,
   the plurality of stand-offs each having an end remote from the first and second split rings, the remote end including means for removably receiving and securing the circuit board on the clamp,
   wherein the circumference of the first split ring may be contracted or expanded independently of the circumference of the second split ring.

9. The clamp recited in claim 8, wherein the shape of the cross-section of the stand-offs is selected from the group consisting of circular and rectangular.

10. The clamp recited in claim 8, wherein the clamp is fabricated from plastic material in one piece.

11. The clamp recited in claim 8, wherein the second distance is greater than the first distance.

12. The clamp recited in claim 8, wherein said first and second split rings are attached by a connecting leg.

* * * * *